(No Model.)
J. W. KEA.
NOSE BAND FOR ANIMALS.
No. 453,259. Patented June 2, 1891.
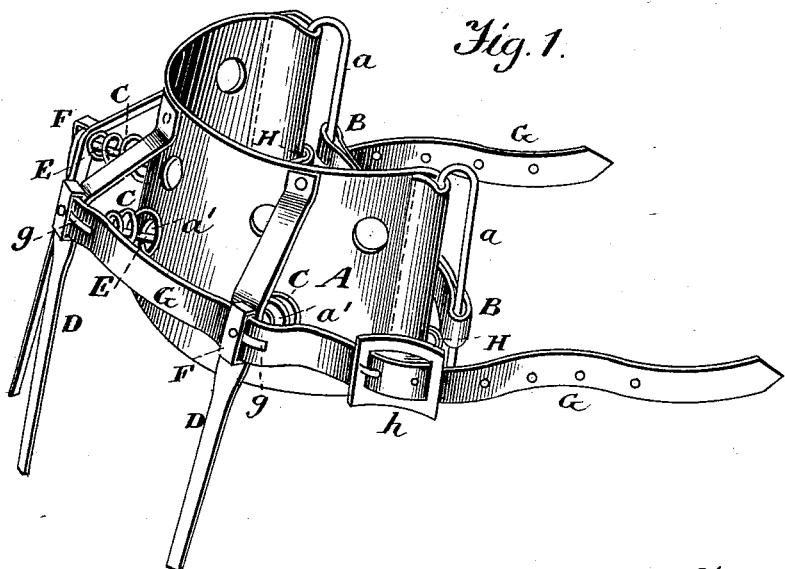
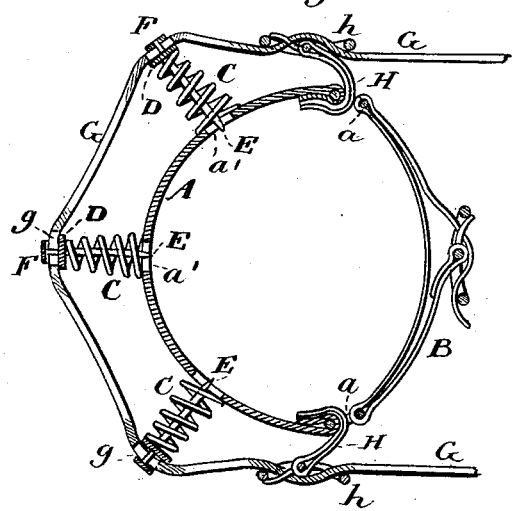
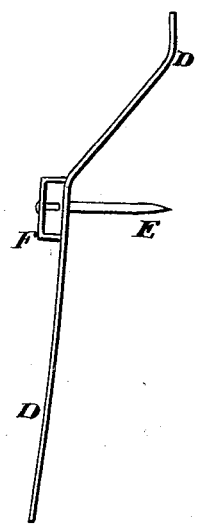
Witnesses.
A. Ruppert
H. A. Daniel
Inventor:
John W. Kea
Per
Thomas P. Simpson
Atty

UNITED STATES PATENT OFFICE.

JOHN W. KEA, OF SHONGALOO, LOUISIANA.

NOSE-BAND FOR ANIMALS.

SPECIFICATION forming part of Letters Patent No. 453,259, dated June 2, 1891.

Application filed October 4, 1890. Serial No. 367,052. (No model.)

*To all whom it may concern:*

Be it known that I, JOHN W. KEA, a citizen of the United States, residing at Shongaloo, in the parish of Webster and State of Louisiana, have invented certain new and useful Improvements in Nose-Bands for Horses and Cattle; and I do hereby declare the following to be a full, clear, and exact description of the invention, such as will enable others skilled in the art to which it appertains to make and use the same.

The special object of the invention is to make a nose-band for horses or cattle, so as to prevent them from throwing or pushing off the upper rails of a fence and from opening gates or barn-doors, and which will also prevent a colt or calf from sucking or a cow from sucking herself.

Figure 1 of the drawings is a perspective view showing the device as an entirety; Fig. 2, a horizontal section thereof, and Fig. 3 a detail side view of one of the fingers.

In the drawings, A represents the flexible strap with the end loops *a a*, which are connected by the small buckle-strap B, so as to be readily fastened about the nose of the animal. The strap A may also be attached at the upper edge to a halter or bridle; but generally this will be unnecessary. In the strap A is made a number of holes *a'*, around the outside of which is secured the base of a conical spiral spring C, whose other end is attached to the inside of a spring-finger D. Through the spring C passes from the finger D a small spike or pin E, with its sharp end extending just within the hole *a'*. When the animal presses his nose against the fence or other object of approach, the spring D is pressed inwardly, carrying with it the spiral spring C and the pin or pricker E. When the latter pricks his nose, the animal will withdraw and forgo his purpose.

In order to keep the fingers D directly over the springs C and from lateral displacement, I make thereon a keeper F, through which passes the strap G, which is fastened to each finger and its keeper. I may make a slot *g* in the strap at its junction with the finger to give the latter a little side play; but it will work very well without it. Each end of the strap G may be connected with a buckle *h* on an end strap H, secured to the strap A.

This nose-band can be used in connection with the martingale by attaching it to the ends of the small strap under the jaw.

I am aware that in halters and breast-straps prickers have been used between two plates or straps, so that when pressed together the animal will be pricked on the nose or breast; but

What I claim as new is—

The fingers D, having outside keepers F, strap G, passing through said keepers and fastened thereto and to the fingers, the straps H H, and the apertured nose-strap A, having end loops connected by a buckle-strap B, all combined with prickers E on the under side of fingers D and surrounded by spiral springs, whereby the device may be applied to the nose of an animal, as and for the purpose described.

In testimony whereof I affix my signature in presence of two witnesses.

JNO. W. KEA.

Witnesses:
    A. S. HOWELL,
    Z. R. KEA.